United States Patent Office 2,780,609
Patented Feb. 5, 1957

2,780,609

PLASTICIZED VINYL CHLORIDE POLYMER

John C. Petropoulos, South Norwalk, Conn., assignor to American Cyanamid Company, New York, N. Y., a corporation of Maine No Drawing. Application February 23, 1955, Serial No. 490,157

20 Claims. (Cl. 260—31.8)

This invention relates to a novel composition of matter comprising a polymer of vinyl chloride plasticized with an alkyl ester of a dicarboxylic acid having the general formula

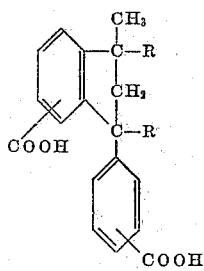

where R is an alkyl group containing from 1-4 carbon atoms, and to the process of preparing the same.

Still further, this invention relates to the plasticization of a polymer of vinyl chloride with an alkyl ester of 3 - (4 - carboxyphenyl)-1,1,3-trimethyl-5-indan carboxylic acid and to the product thus produced.

One of the objects of the present invention is to plasticize polyvinyl chloride and/or copolymers of polyvinyl chloride with vinyl acetate by the use of an alkyl ester of a dicarboxylic acid such as those set forth hereinabove. The monohydric aliphatic alcohol used to form these alkyl esters may contain between 1 and 12 carbon atoms and preferably between 4 and 8 carbon atoms. These and other objects of the present invention will be discussed in greater detail hereinbelow.

The starting materials utilized in the preparation of the dicarboxylic acids of the present invention are substituted styrenes having an alkyl group or a halo group in the alpha position and a methyl group on the ring. The alkyl group in the alpha position may be any one of methyl, ethyl, propyl, and butyl. The propyl group may be either n-propyl or isopropyl and the butyl group may be either n-butyl, isobutyl or tertiary butyl. The methyl group on the ring may be in either the ortho, meta or para position. Representative of the class of alkyl substituted styrenes which may be used in the practice of the process of the present invention are α, o-dimethylstyrene, α, m-dimethylstyrene, α, p-dimethylstyrene, α-ethyl-o-methylstyrene, α-ethyl-m-methylstyrene, α-ethyl-p-methylstyrene, α-propyl-o-methylstyrene, α-propyl-m-methylstyrene, α-propyl-p-methylstyrene, α-butyl-o-methylstyrene, α-butyl-m-methylstyrene, α-butyl-p-methylstyrene and the like. In the place of the alkyl groups containing between 1 and 4 carbon atoms which may be substituted on the side chain in the α position, one may utilize the halo substituents such as the chloro, bromo, iodo and fluoro. Representative of this class of compounds are α-chloro-m-methylstyrene, α-bromo-p-methylstyrene, α-iodo-o-methylstyrene, α-fluoro-p-methylstyrene and the like. The methyl substituent on the ring may be the sole substituent on the ring or it may be accompanied by other substituents such as other alkyl groups, halo groups, such as those mentioned hereinabove, and the like. In order that the process for the preparation of the dimers utilized in the practice of the process of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

DIMERIZATION OF α,p-DIMETHYLSTYRENE 800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α, p-dimethylstyrene dissolved in 200 parts of toluene. The resulting mixture is allowed to react for ½ hour at 0–5° C. and is then hydrolyzed with 120 parts of water. The organic layer, is washed free of acidic material, with water and is distilled to yield 250 parts of a colorless oil having a boiling point of 142–144° C. at 0.8 mm. This oil solidifies and has a melting point of 37–38° C. uncorrected.

DIMERIZATION OF α-ETHYL-p-METHYLSTYRENE

To 400 parts of toluene at 5° C., there is added slowly 70 parts of 95% sulfuric acid followed by 144 parts of α-ethyl-p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–165° C. at 1 mm.

DIMERIZATION OF α, META-DIMETHYLSTYRENE

To 200 parts of toluene at 0–5° C., there is added slowly 35 parts of 95% sulfuric acid, 65 parts of α, m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure.

DIMERIZATION OF CRUDE α, p-DIMETHYLSTYRENE

To 368 parts of toluene at 10° C., there is added slowly 50 parts of anhydrous aluminum chloride followed by 516 parts of crude (undistilled) α, p-dimethylstyrene dissolved in 368 parts of toluene while maintaining the temperature below 10° C. After a 20-minute reaction time, the mixture is hydrolyzed with water and the organic layer is collected and dried. The organic material is distilled to give 150 parts of a colorless oil having a boiling point of 138–140° C. at 0.5–1 mm.

DIMERIZATION OF α, p-DIMETHYLSTYRENE

A mixture of 310 parts of freshly distilled α, p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure.

PREPARATION OF 3-(4-CARBOXYPHENYL)-1,1,3-TRIMETHYL-5-INDAN CARBOXYLIC ACID

Into a suitable reaction vessel equipped with thermometer, stirrer and reflux condenser, there is introduced 34 parts of the dimer of α, p-dimethylstyrene, 57 parts of concentrated nitric acid and 80 parts of water and the mixture is refluxed for 48 hours. The yield, amounting to about 32 parts, was a light tan solid. This product is collected and washed free of acid with water. 10 parts of this product is dissolved in 150 parts of 1 N sodium hydroxide and there is added thereto 10 parts of potassium permanganate and the resulting mixture is allowed to reflux for ½ hour. The mixture is acidified and then treated with sodium sulfite, in order to reduce the manganese dioxide to manganese sulfate. This gave a yield of 11 parts of a light tan solid which after recrystallization from acetic acid became colorless and had a neutral equivalent of 162 and a melting point of 293–4° C. uncorrected.

*Analysis.*—Calculated for $C_{20}H_{20}O_4$: C, 74.05; H, 6.22; COOH, 27.79. Found: C, 73.83; H, 6.23; COOH, 27.73.

PREPARATION OF 3-(4-CARBOXYPHENYL)-1,1,3-TRIMETHYL-5-INDAN CARBOXYLIC ACID

Into an autoclave, there is introduced 26.4 parts of the dimer of α, p-dimethylstyrene, 66.2 parts of concentrated nitric acid and 61 parts of water and the mixture is heated slowly in the autoclave. At 150° C., an exothermic reaction develops and the temperature and pressure increased to 190° C. and 1000 p. s. i., respectively. After about 10 minutes at 190° C., the autoclave is cooled and the product amounting to about 26 parts (80% yield), is collected. The resulting product is a light tan solid having a melting point of 278–285° C. and had a neutral equivalent of 164. When this product is recrystallized from acetic acid, the colored nitration product impurities are substantially completely removed and the melting point is raised to 293–294° C.

PREPARATION OF 3-(4-CARBOXYPHENYL)-1,3-DIETHYL-1-METHYL-5-INDAN CARBOXYLIC ACID

A mixture of 14.6 parts of the dimer of α-ethyl, p-methylstyrene, 23 parts of concentrated nitric acid (specific gravity 1.42) and 30 parts of water is heated slowly in an autoclave until a temperature of 190–195° C. is reached. The reaction mixture is held at this temperature for 14 minutes and then allowed to cool to room temperature. The product, a light tan solid, having a neutral equivalent of 175–180, is collected in approximately 75–80% yield. The product thus produced may be further purified by recrystallization from glacial acetic acid or methyl isobutyl ketone.

PREPARATION OF 3-(3-CARBOXYPHENYL)-1,1,3-TRIMETHYL-6-INDAN CARBOXYLIC ACID

A mixture of 13 parts of the dimer of α, m-dimethylstyrene, 23 parts of concentrated nitric acid (specific gravity 1.42) and 30 parts of water are heated slowly in an autoclave until a temperature of about 190–195° C. is reached. The reaction mixture is held at this temperature for about 15 minutes and then allowed to cool to room temperature. The product, a light tan solid having a neutral equivalent of about 160–164 is collected in an approximate yield of 78–84%. Again this product may be further purified by recrystallization as in the preceding example.

Amongst the polycarboxylic acids which may be used to prepare the dialkyl esters of these carboxylic acids are 3-(4-carboxyphenyl)-1,1,3-trimethyl-5-indan carboxylic acid; 3-(4-carboxyphenyl)-1,3-diethyl-1-methyl-5-indan carboxylic acid; 3-(4-carboxyphenyl)-1,3-dipropyl-1-methyl-5-indan carboxylic acid; 3-(4-carboxyphenyl)-1,3-dibutyl-1-methyl-5-indan carboxylic acid; 3-(3-carboxyphenyl)-1,1,3-trimethyl-6-indan carboxylic acid; 3-(3-carboxyphenyl)-1,3-diethyl-1-methyl-6-indan carboxylic acid; 3-(3-carboxyphenyl)-1,3-dipropyl-1-methyl-6-indan carboxylic acid; 3-(3-carboxyphenyl)-1,3-dibutyl-1-methyl-6-indan carboxylic acid; 3-(4-carboxyphenyl)-1,3-dichloro-1-methyl-5-indan-carboxylic acid; 3-(4-carboxyphenyl)-1,3-dibromo-1-methyl-5-indan carboxylic acid; 3-(4-carboxyphenyl)-1,3-diiodo-1-methyl-5-indan carboxylic acid; 3-(3-carboxyphenyl)-1,3-dichloro-1-methyl-6-indan carboxylic acid; 3-(3-carboxyphenyl)-1,3-dibromo-1-methyl-6-indan carboxylic acid; 3-(3-carboxyphenyl)-1,3-diiodo-1-methyl-6-indan carboxylic acid; 3-(2-carboxyphenyl)-1,1,3-trimethyl-7-indan carboxylic acid; 3-(2-carboxyphenyl)-1,3-diethyl-1-methyl-7-indan carboxylic acid; 3-(2-carboxyphenyl)-1,3-dipropyl-1-methyl-7-indan carboxylic acid; 3-(2-carboxyphenyl)-1,3-dibutyl-1-methyl-7-indan carboxylic acid; 3-(2-carboxyphenyl)-1,3-dichloro-1-methyl-7-indan carboxylic acid; 3-(2-carboxyphenyl)-1,3-dibromo-1-methyl-7-indan carboxylic acid; 3-(2-carboxyphenyl)-1,3-diiodo-1-methyl-7-indan carboxylic acid and the like. Obviously, these acids may be used either singly or in combination with one another.

The alkyl esters of these acids may be prepared by esterifying these acids with an aliphatic monohydric alcohol having between 1 and 12 carbon atoms and for the use in the plasticization of polymers of vinyl chloride, preferably, between 4 and 8 carbon atoms. Such monohydric aliphatic alcohols as methanol, ethanol, propanol, butanol, amyl alcohol, hexyl alcohol, heptyl alcohol, octyl alcohol, nonyl alcohol, decyl alcohol, undecyl alcohol, dodecanol and the like may be used.

In order to illustrate how these diesters may be prepared, the following examples are set forth in which all parts are parts by weight. These examples are set forth primarily for the purpose of illustration and any specific enumeration of detail contained therein should not be interpreted as a limitation on the case except as is indicated in the appended claims.

Example 1

A mixture of 32.4 parts of 3-(4-carboxyphenyl)-1,1,3-trimethyl-5-indan carboxylic acid, 188 parts of butanol, 20 parts of xylol and 0.3 part of p-toluene sulfonic acid are refluxed for 20 hours, during which time the water of esterification is removed azeotropically. After the excess butanol and xylol are removed by distillation, the residue is dissolved and washed free of acid materials with dilute sodium bicarbonate. The evaporation of the ether solution gave an oily residue, which after distillation produced 35 parts (81% yield) of a pale yellow viscous oil having a boiling point of 259–260° C. at 0.5 mm.

Example 2

A mixture of 25 parts of 3-(4-carboxyphenyl)-1,1,3-trimethyl-5-indan carboxylic acid and 75 parts of 2-ethyl hexanol is refluxed at a temperature of 185–200° C. and the water of esterification is removed azeotropically. The excess alcohol is stripped off under vacuum leaving a dark viscous residue having an acid number of 15. This residue is dissolved in dry ether, and is passed over an activated alumina column which removes substantially all of the acidic material and substantially all of the colored impurities. The evaporation of the ether therefrom afforded 29 parts (70% yield) of a light yellow, very viscous oil of an acid number less than 1.

One of the principal end uses for the dialkyl esters of the the indan carboxylic acids of this invention will be in the field of plasticizing resinous materials such as polyvinyl chloride and nitrocellulose lacquers. The following examples illustrate the effectiveness of these dialkyl esters as plasticizers for polyvinyl chloride.

Example 3

100 parts of polyvinyl chloride and 50 parts of the dibutyl ester of 1-(4-carboxyphenyl)-1,3,3-trimethyl-6-indan carboxylic acid were blended together and fluxed on hot mill rolls. The mill temperature was about 130° C. and the mill time was 20 minutes. After that period, a sheet is removed from the rolls which has a leathery feeling but is fairly brittle at room temperature.

Example 4

Example 3 is repeated in every detail except that the mill temperature is 150° C. and the mill time is 5 minutes. The resulting plasticized polyvinyl chloride is quite stiff and brittle at room temperature but had a definite indication that the polyvinyl chloride had been plasticized.

Example 5

100 parts of polyvinyl chloride and 50 parts of the dioctyl ester of 1-(4-carboxyphenyl)-1,3,3-trimethyl-6-indan carboxylic acid are blended and fluxed on hot mill rolls wherein the temperature of the rolls is about 130° C. and the mill time is 20 minutes. A plasticized polyvinyl chloride sheet is produced.

Example 6

Example 5 is repeated in every detail except that the mill temperature is 150° C. and the mill time is 12 minutes. A plasticized sheet of polyvinyl chloride is removed with some difficulty from the mill rolls.

Example 7

100 parts of polyvinyl chloride and 100 parts of the dioctyl ester of 1-(4-carboxyphenyl)-1,3,3-trimethyl-6-indan carboxylic acid are blended and fluxed on hot mill rolls at a temperature of about 150° C. for 9 minutes. The resulting sheet is very flexible and has a rubbery feeling.

Example 8

100 parts of polyvinyl chloride and 100 parts of the dibutyl ester of 1-(4-carboxyphenyl)-1,3,3-trimethyl-6-indan carboxylic acid are blended and fluxed on hot mill rolls at a temperature of about 150° C. for 9 minutes. The resulting sheet is fairly flexible but not quite as flexible as the sheet produced according to Example 7. The sheet produced according to the present example, however, had a leathery feeling.

In the plasticization of polymers of vinyl chloride or copolymers of vinyl chloride and vinyl acetate or nitrocellulose lacquers, the amount of the alkyl esters of the indan carboxylic acids which may be used can be varied over a substantially wide range, depending on the degree of plasticization desired. As the amount of the dialkyl esters of the indan carboxylic acids is increased, the greater is the plasticity of the resultant sheet. One may use from about 5 to 200 parts of these dialkyl esters per 100 parts of the polyvinyl chloride and the like. Actually, one would prefer to use for most applications between about 50 and 150 parts of these dialkyl esters per 100 parts of the polymer.

If it is desired to produce sheet material having certain patricular effects, one may accomplish the same by adding dyes and/or pigments, opacifiers, fillers and the like.

This application is a continuation-in-part of my earlier patent application having the Serial No. 414,860, filed March 8, 1954, having the title "Novel Compositions of Matter and Processes of Preparing Same." My earlier application discloses the indan polycarboxylic acids which are used to make the diallyl esters of the present invention and process of preparing them.

I claim:

1. A composition of matter comprising a member selected from the group consisting of a copolymer of vinyl chloride and vinyl acetate and polyvinyl chloride and a dihomoalkyl ester of an acid having the formula

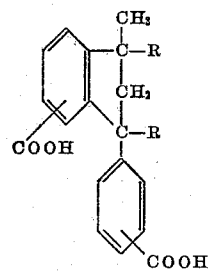

where R is an alkyl group containing from 1–4 carbon atoms and is the same in each instance.

2. A composition of matter comprising a copolymer of vinyl chloride and vinyl acetate and a dihomoalkyl ester of an acid having the formula

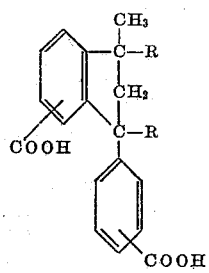

where R is an alkyl group containing from 1–4 carbon atoms and is the same in each instance.

3. A composition of matter comprising polyvinyl chloride and a dihomoalkyl ester of 3-(4-carboxyphenyl)-1,1,3-trimethyl-5-indan carboxylic acid.

4. A composition of matter comprising a copolymer of vinyl chloride and vinyl acetate and a dihomoalkyl ester of 3-(4-carboxyphenyl)-1,1,3-trimethyl-5-indan carboxylic acid.

5. A composition of matter comprising polyvinyl chloride and a dibutyl ester of an acid having the formula

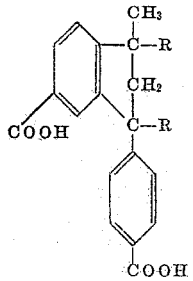

where R is an alkyl group containing from 1–4 carbon atoms and is the same in each instance.

6. A composition of matter comprising polyvinyl chloride and a dihexyl ester of an acid having the formula

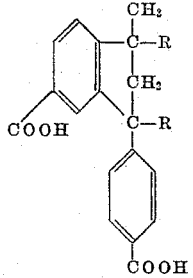

where R is an alkyl group containing from 1–4 carbon atoms and is the same in each instance.

7. A composition of matter comprising polyvinyl chloride and a dioctyl ester of an acid having the formula

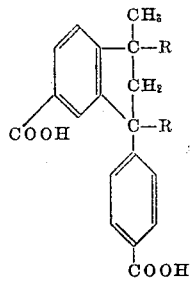

where R is an alkyl group containing from 1–4 carbon atoms and is the same in each instance.

8. A composition of matter comprising polyvinyl chloride and a diamyl ester of an acid having the formula

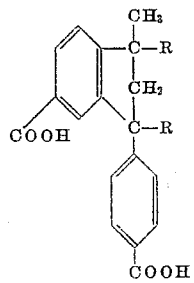

where R is an alkyl group containing from 1–4 carbon atoms and is the same in each instance.

9. A composition of matter comprising polyvinyl chloride and a diheptyl ester of an acid having the formula

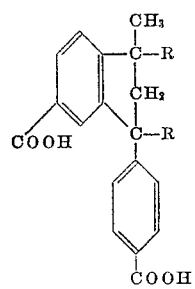

where R is an alkyl group containing from 1–4 carbon atoms and is the same in each instance.

10. A composition of matter comprising polyvinyl chloride and the dibutyl ester of 3-(4-carboxyphenyl)-1,1,3-trimethyl-5-indan carboxylic acid.

11. A composition of matter comprising polyvinyl chloride and the dihexyl ester of 3-(4-carboxyphenyl)-1,1,3-trimethyl-5-indan carboxylic acid.

12. A composition of matter comprising polyvinyl chloride and the dioctyl ester of 3-(4-carboxyphenyl)-1,1,3-trimethyl-5-indan carboxylic acid.

13. A composition of matter comprising polyvinyl chloride and the diamyl ester of 3-(4-carboxyphenyl)-1,1,3-trimethyl-5-indan carboxylic acid.

14. A composition of matter comprising polyvinyl chloride and the diheptyl ester of 3-(4-carboxyphenyl)-1,1,3-trimethyl-5-indan carboxylic acid.

15. A dihomoalkyl ester of a dicarboxylic acid having the general formula:

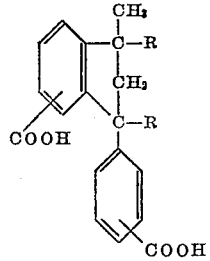

wherein R is an alkyl group containing from 1–4 carbon atoms and is the same in each instance and wherein the alcohol from which the alkyl ester is derived is an aliphatic alcohol containing from 1–12 carbon atoms.

16. A dihomoalkyl ester of a dicarboxylic acid having the general formula:

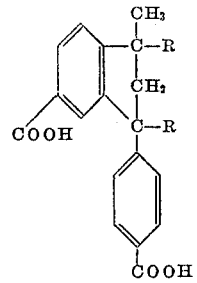

wherein R is an alkyl group containing from 1–4 carbon atoms and is the same in each instance and wherein the alcohol from which the alkyl ester is derived is an aliphatic alcohol containing from 1–12 carbon atoms.

17. The dioctyl ester of 3-(4-carboxyphenyl)-1,1,3-trimethyl-5-indan carboxylic acid.

18. The dibutyl ester of 3-(4-carboxyphenyl)-1,1,3-trimethyl-5-indan carboxylic acid.

19. The dihexyl ester of 3-(4-carboxyphenyl)-1,1,3-trimethyl-5-indan carboxylic acid.

20. The diamyl ester of 3-(4-carboxyphenyl)-1,1,3-trimethyl-5-indan carboxylic acid.

No references cited.